Nov. 1, 1927.  1,647,486
G. A. R. TRIMMING
TRANSITION COUPLING FOR RAILWAY OR LIKE VEHICLES
Filed Aug. 20, 1926  2 Sheets-Sheet 1
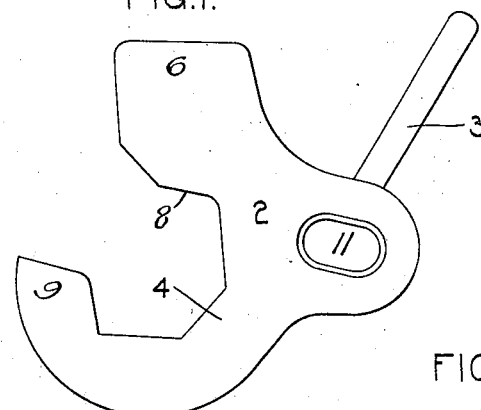
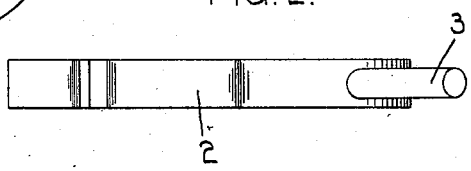
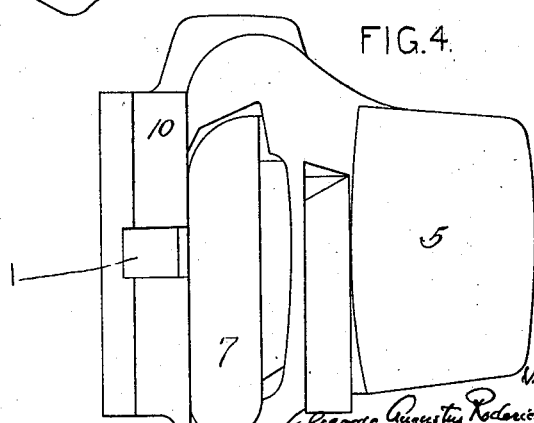

Patented Nov. 1, 1927.

1,647,486

UNITED STATES PATENT OFFICE.

GEORGE AUGUSTUS RODERICK TRIMMING, OF LUCKNOW, BRITISH INDIA.

TRANSITION COUPLING FOR RAILWAY OR LIKE VEHICLES.

Application filed August 20, 1926, Serial No. 130,536, and in Great Britain July 14, 1926.

In my prior Patent No. 1,568,933 is shown a transition coupling device for railway vehicles adapted to enable an "unconverted" vehicle, such, for example, as is ordinarily fitted with a screw coupling, or other non-automatic coupling gear, or with central couplings other than an automatic coupling gear, to be coupled to a "converted" or other vehicle fitted with an automatic coupler, said transition device in the form of a locking member, being attached to the draw-bar shackle, draw-hook or equivalent of the "unconverted" vehicle and so arranged that when held up in a horizontal longitudinal direction it is adapted to engage and operate and couple to an automatic coupler fixed to a vehicle fitted therewith. substantially in the same manner as another automatic coupler would couple.

The automatic coupler with which the transition coupling device is to be used has a slot or equivalent, cut or made in the knuckle nose, or any other convenient part, of the automatic coupler adapted to support the transition device in place when in effective use.

The specific embodiment of the invention described in my said earlier patent comprises an automatic coupler of the pivoted knuckle type, such as the "Janney" coupler, tho' in said patent I have distinctly stated that the invention is applicable for use with vehicles having other automatic central buffing arrangements of the pivoted knuckle type, such as the "Willison", for example. Now, the "Willison" type of coupler is generally known as a coupler having a rigid jaw and not a pivoted knuckle and in the railway world a Willison coupler is a rigid jaw coupler. The present application is in respect of the particular modification of the device described in my said earlier patent to adapt it for use with the coupler well known as the "Willison" coupler, namely, a coupler having a rigid jaw as distinguished from a pivoted knuckle. As I have stated in my said earlier patent the transition coupling device, or locker, consist of a plate-like member having a general contour in respect to the parts adapted to engage with an automatic coupler, and the only alteration it is necessary to make in said automatic coupler is the cutting of a slot or recess in a convenient part thereof to support the transition device in proper position when in effective engagement therewith.

On the accompanying drawings, Figs. 1 and 2 show in plan and side elevation respectively a transition coupling device, or locker, suitable for engagement with a "Willison" automatic coupler.

Figs. 3 and 4 illustrate in side elevation and front elevation respectively a standard "Willison" coupling head.

Figure 5:
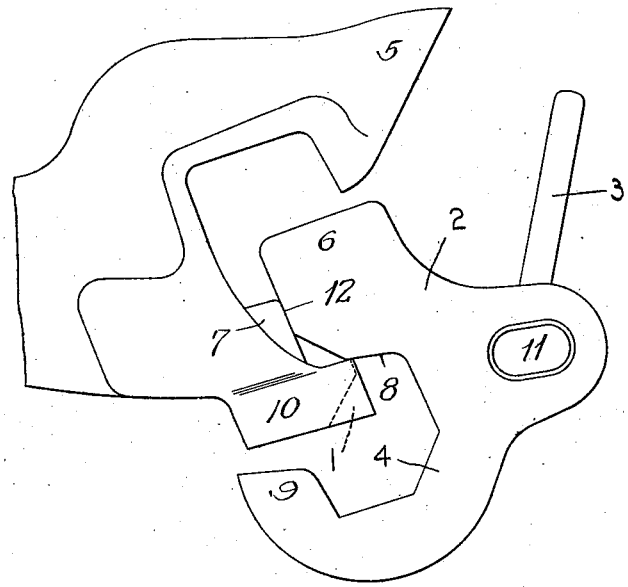
Fig. 5 is a plan showing the "Willison" coupler and the transition coupling device, or locker, being brought into contact, the view showing the position of the parts before effective contact has taken place.
Figure 6:
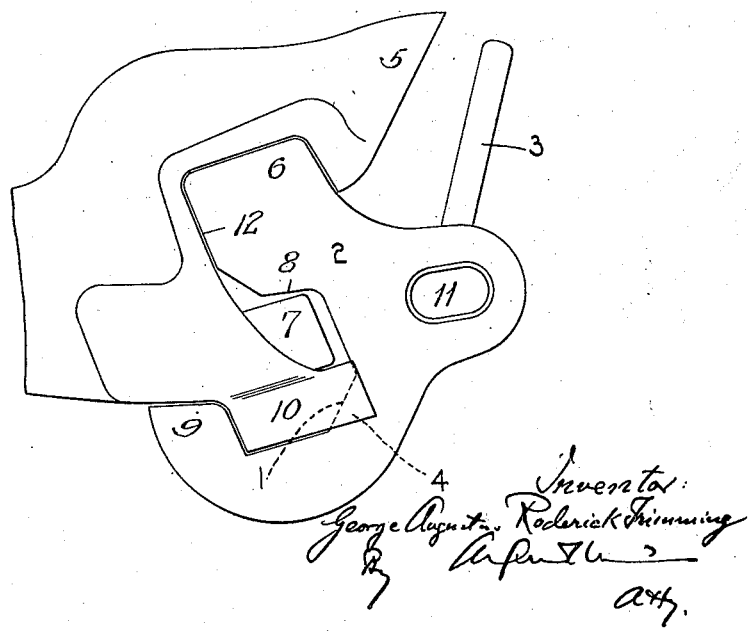
Fig. 6 is a similar view to Fig. 5 showing the "Willison" coupler head coupled to the transition device, or locker.

The "Willison" coupling head, see Figs. 3 and 4, is formed with a recess 1 in one of the fixed jaws thereof, namely jaw 10 whereby the transition device, or locker, 2 shown in Figs. 1 and 2 is supported when the said device is in position of engagement.

The transition coupling device, or locker, 2 consists of a plate-like member adapted to meet, operate and lock into the automatic coupler. It is hung from the draw-bar shackle, or draw-hook, of the unconverted vehicle, by means of a link (not shown) engaging a slot 11 provided therefor in the transition coupling, or locker, 2.

3 indicates a handle projecting from the locker 2 to facilitate the holding up of the same in position for coupling. 5 indicates the hook-like fixed jaw of the "Willison" coupler and 6 the part of the transition coupling 2 adapted to engage behind said fixed jaw 5. 7 indicates the sliding bolt of the "Willison" coupler which engages the face 8 of the transition coupling when the latter is coupled to the "Willison" coupler. 9 indicates a hook-like portion of the transition coupling adapted to engage behind the part 10 of the "Willison" coupler when the couplings are engaged.

The construction is such that in order to couple two vehicles, one fitted with the "Willison" coupler and the other furnished with the improved transition coupling, the latter is held by hand in a horizontal position, and as the transition coupling approaches the "Willison" coupler, the face 12 of the portion 6 of the transition coupling strikes the sliding bolt 7 of the Willison coupler, pushing it inwardly against its gravity or spring-action, until the said bolt is sufficiently within the coupling head as to allow the part 6 of the transition coupling to slide behind the fixed jaw 5 of the Willison coupler and the hook-like portion 9 of the transition coupling to slide behind the fixed jaw 10 of said coupler. The sliding bolt 7 then moves forward into engagement with the face 8 of the transition coupling thereby locking the couplings in their position of engagement. Towards the end of the coupling operation, the portion 4 of the transition coupling enters the recess 1 in the fixed jaw 10 of the "Willison" coupler, and thus the transition coupling is supported so that it cannot move down or up out of engagement with the "Willison" coupler. The handle 3 facilitates the holding of the locker in a horizontal position in the act of coupling.

The foregoing description of the application of the device to a "Willison" coupler illustrates generally, how the said device can be applied to couplings of the fixed jaw type.

What I claim is:—

1. For use with an automatic car coupling of the "Willison" type having rigid jaws, one thereof being formed with a recess, and having a movable locking member, a transition locking device consisting of a plate-like member having a face adapted to engage and actuate the said locking member, a supporting portion adapted to engage the said recess, and portions adapted to engage behind the rigid jaws of said coupling so as to receive the pull exerted thereon.

2. For use with an automatic car coupling of the "Willison" type having rigid jaws, one thereof being formed with a recess, and having a movable locking member, a transition locking device consisting of a plate-like member having a face adapted to engage and actuate the said locking member, a supporting portion adapted to engage the said recess, portions adapted to engage behind the rigid jaws of said automatic car coupling so as to receive the pull exerted thereon, and a slotted rear portion adapted to receive the link of a non-automatic coupling.

3. For use with an automatic car coupling of the "Willison" type having rigid jaws, one thereof being formed with a recess, and having a movable locking member, a transition locking device consisting of a plate-like member having a face adapted to engage and actuate the said locking member, a supporting portion adapted to engage the said recess, portions adapted to engage behind the rigid jaws of said coupling so as to receive the pull exerted thereon, a slotted rear portion adapted to receive the link of a non-automatic coupling, and a laterally projecting arm constituting a handle for said locking device.

In testimony whereof I affix my signature.

GEORGE AUGUSTUS RODERICK TRIMMING.